UNITED STATES PATENT OFFICE.

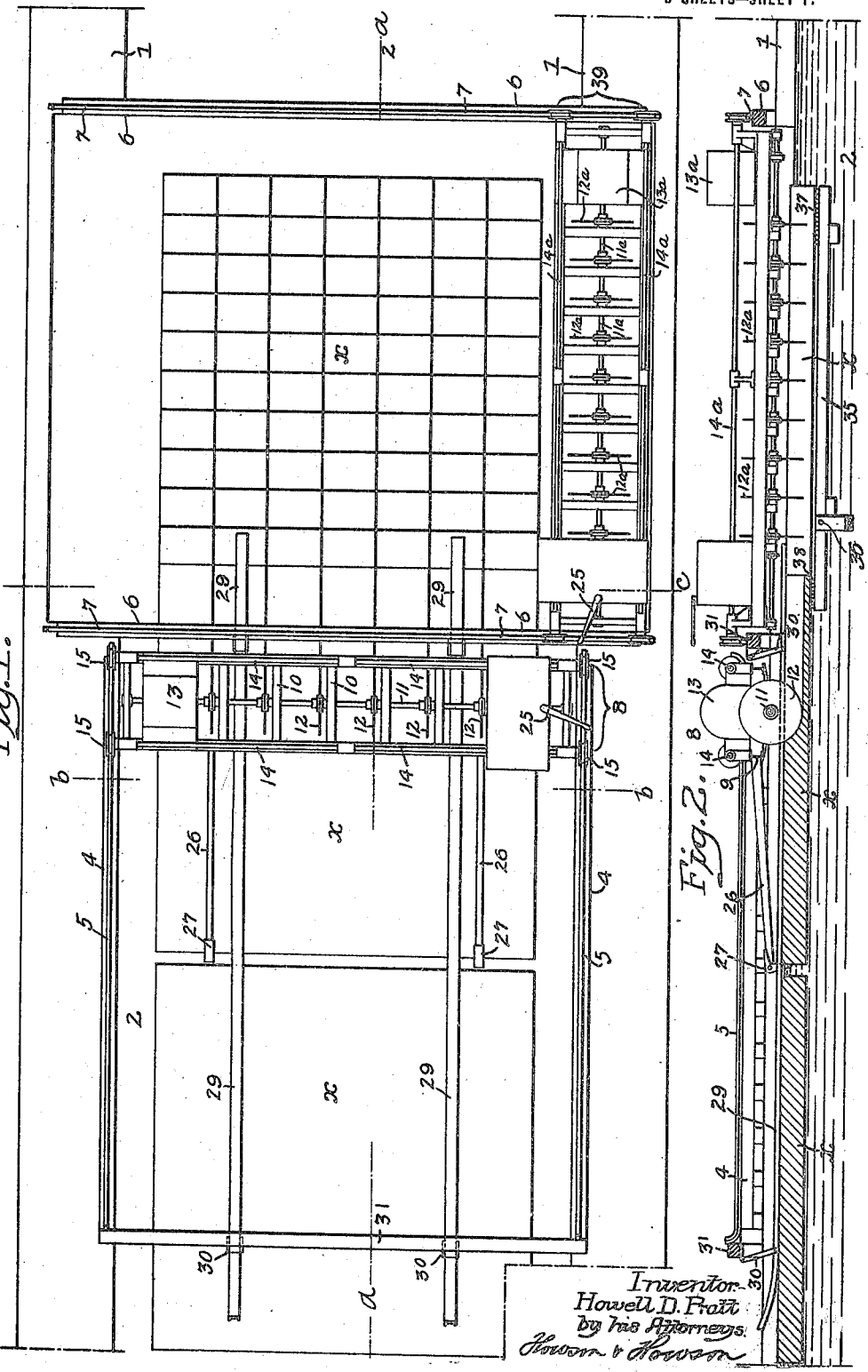

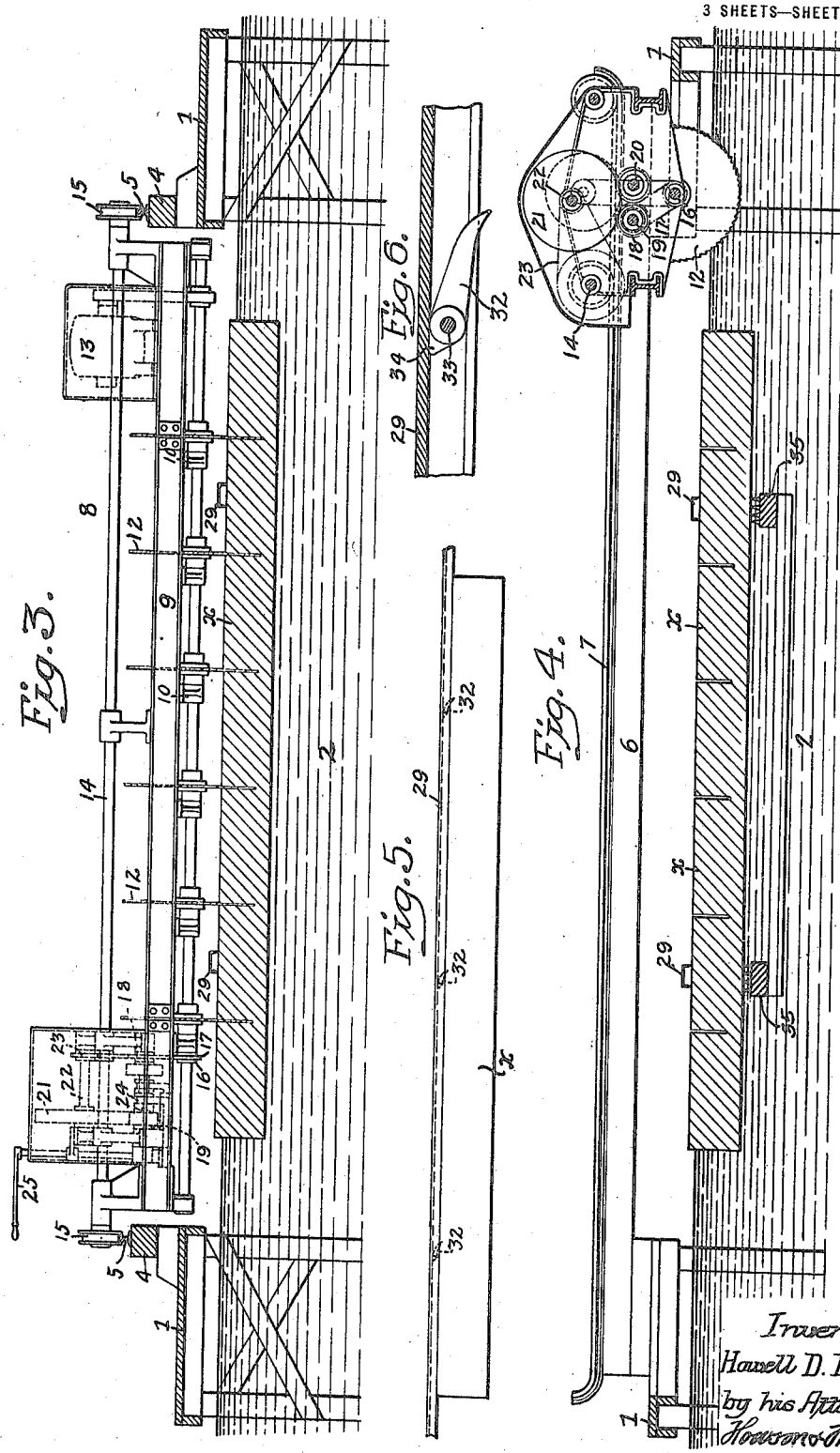

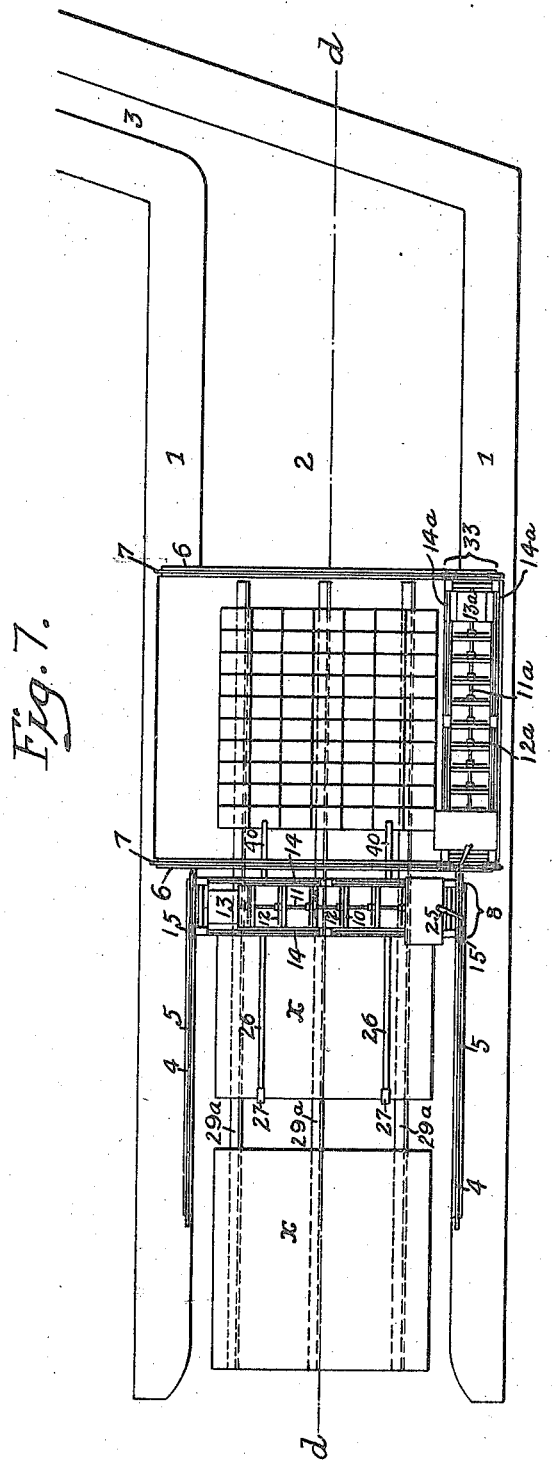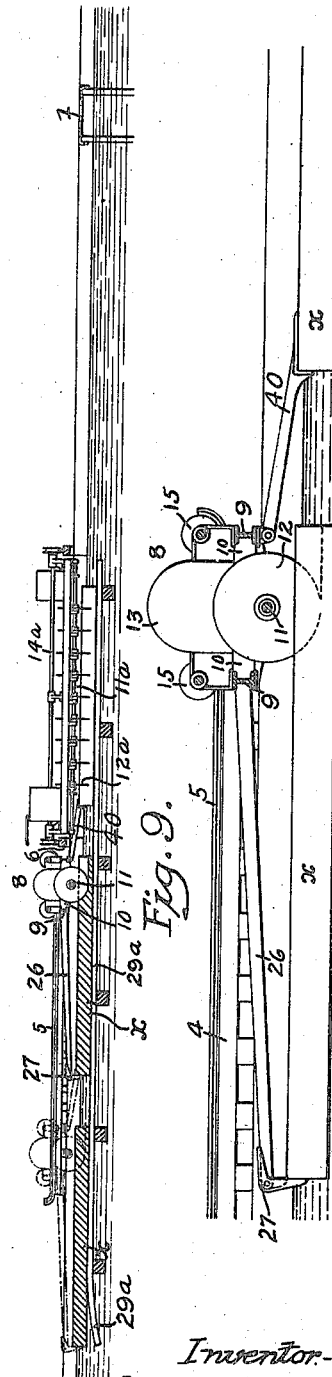

HOWELL D. PRATT, OF PHILADELPHIA, PENNSYLVANIA, ASSIGNOR TO LINK-BELT COMPANY, OF CHICAGO, ILLINOIS, A CORPORATION OF ILLINOIS.

MECHANISM FOR CUTTING ICE INTO BLOCKS.

1,257,738.

Specification of Letters Patent.   Patented Feb. 26, 1918.

Application filed October 5, 1915. Serial No. 54,232.

*To all whom it may concern:*

Be it known that I, HOWELL D. PRATT, a citizen of the United States, residing in Philadelphia, Pennsylvania, have invented certain Improvements in Mechanism for Cutting Ice into Blocks, of which the following is a specification.

One object of my invention is to improve the construction of the mechanism for cutting large blocks of ice into smaller blocks or cakes suitable for storage in ice houses or for transportation.

Another object of the invention is to construct a machine in which the saw frames travel over the blocks of ice while the ice is stationary.

A still further object of the invention is to provide a machine in which one saw frame will travel longitudinally in respect to a block of ice, while the other saw frame will travel transversely, cutting longitudinal and transverse kerfs in the ice.

Another object of the invention is to provide means attached to one of the saw frames for shifting the blocks of ice into and out of position to be cut.

These objects and other advantageous ends I secure in the following manner, reference being had to the accompanying drawings, in which:

Figure 1 is a plan view of my improved ice cutting machine;

Fig. 2 is a longitudinal sectional view on the line $a$—$a$, Fig. 1;

Fig. 3 is a transverse sectional view on the line $b$—$b$, Fig. 1;

Fig. 4 is a sectional view on the line $c$—$c$, Fig. 1;

Fig. 5 is a detached side view of a block of ice, showing the upper guide rail;

Fig. 6 is an enlarged sectional view of a portion of the upper guide rail, showing one of the detent dogs;

Fig. 7 is a view illustrating a modification of the invention;

Fig. 8 is a longitudinal sectional view on the line $d$—$d$, Fig. 7; and

Fig. 9 is an enlarged view of a portion of Fig. 8.

Referring in the first instance to Figs. 1 to 6 inclusive, 1, 1 are the frames or walls which are spaced apart to form a channel 2. This channel communicates with a pond, lake, or river, at one end and is arranged to receive the floating blocks of ice and may be connected, as in Fig. 7, with a narrow channel 3 through which the small blocks of ice travel to the storage house or transportation platform. Mounted on the frame 1 are longitudinal stringers 4 on which are the longitudinal rails 5 and extending across the channel from one frame to the other are transverse stringers 6 on which are the rails 7. Mounted on the longitudinal rails 5 is a saw carriage 8 made of longitudinal I-beams 9 connected together at intervals by brackets 10, which carry the saw shaft 11. On this shaft is a series of circular saws 12. These saws are preferably adjustable on the shaft and can be spaced any distance desired, according to the size of the blocks to be cut. The shaft 11 is driven, in the present instance, from a motor 13.

14, 14 are two longitudinal axles adapted to suitable bearings in the frame 8 and on each end of these axles are grooved wheels 15, which travel on the rails 5. In the present instance, one or both of these axles is driven from the motor 13 through the saw shaft 11. On the saw shaft is a sprocket wheel 16 around which passes a chain 17 to a sprocket wheel 18 on a shaft 19 and this shaft, in turn, is geared to a shaft 20 and both shafts have friction wheels bearing against the friction wheel 21 on a shaft 22, which drives one of the axles 14 through the chain 23, as clearly shown in detail in Figs. 3 and 4. A clutch 24 on the shaft 19 is controlled by a hand lever 25 so that either one of the friction wheels 18 or 20 can be driven to traverse the longitudinally movable saw frame in either direction over the rails 5 and on the forward movement of the saw frame a series of longitudinal kerfs is cut by the saws in each block of ice $x$ located in the path of the saws. Projecting forwardly from the frame 8 are arms 26 which carry hooks 27 at their outer ends and these hooks travel over the face of the ice and engage the rear edge of each block $x$ and when the carriage returns it carries a block of ice with it to the cutting position, the saws having partially entered the block of ice on the forward movement and these saws, together with the hooks, determine the position of the block.

In order to hold the blocks of ice rigidly during the cutting operation, I provide rails 29 which are suspended by links 30 from supports 31 above the ice and these rails are in the form of inverted channels, as shown in Figs. 3 and 4, and the rails are of a sufficient weight to cause the edges of the channel to cut into the block of ice sufficiently to prevent any lateral movement of the block as it is being cut by the saws. The rails not only guide the blocks being cut, but also the block following it so as to insure the proper positioning of each block prior to the cutting operation.

The rails 29 are comparatively heavy and rest upon the block with sufficient weight to overcome the free buoyancy of the ice so that when the block is subjected to the action of the saws it will be held rigidly in order to prevent jamming of the saws or uneven cutting. The rails are turned up at their forward ends so that a block of ice will travel gradually under the rails.

In order to prevent the blocks of ice backing away from the saws, I provide detent dogs 32, which are pivoted to the rails at 33 and as the rails, in the present instance, are channel shaped I locate the dogs in the channel and provide a stop 34 to limit the downward movement of the points of the dogs. These points are preferably sharp so that they will engage the ice, should it have a tendency to back away from the saws.

The rails 29 are discontinued at the transverse saws, preferably overlapping the block sufficiently to hold it temporarily in alinement.

The block, as it moves in the path of the transverse saws, passes over a frame 35 pivoted at 36 to a beam secured to the walls of the channel and this frame has spikes, or other projections, 37 and 38 at each end so as to engage the ice and hold it in position while the saws are moving transversely over the blocks and are cutting the transverse kerfs therein. The frame 35 acts as a brake since it holds the ice from floating past a predetermined point. The saw frame 39 for cutting the transverse kerfs in the blocks of ice is identical with the saw frame 8, including the mechanism for driving the shaft 11ª, the motor 13ª and saws 12ª, as well as the mechanism for transmitting motion from one saw shaft to one of the axles 14ª and therefore, need not be further described in detail.

It will be seen from the above construction that blocks of ice cut from fields in any desired shape can be directed to the channel, either by a frame projecting into the lake or river or formed on the bank of the lake or river, and after the blocks enter the channel, and are brought to a fixed position, the longitudinally moving saw frame is reciprocated or is moved forward and will cut a series of kerfs in the ice. The movement of the saw frame is continued and the saws will cut a partial series of kerfs in the succeeding block and when the saws reach a given point the hooks 27 on the arms 26 drop back of the block of ice and on the return movement of the saw frame 8 the succeeding block will be moved forward into the cutting position and will push the block previously cut into position to be cut by the transverse saws. The brake frame 35 will hold the block in the proper position, while the saw frame 39 passes transversely over the surface of the block cutting the transverse kerfs therein and on the return of this transverse cutting frame the block is free and is pushed out of the path of the saws by the following block, after which the individual blocks can be separated in any suitable manner and conveyed to the storage house or other point of distribution.

It will be understood that the saws can cut the kerfs to any depth desired and, in most instances, the saws do not cut entirely through the block but leave sufficient ice to allow the entire block to be conveyed as a unit so that it can be broken either by hand or by any suitable mechanism at any desired point.

In Figs. 7, 8 and 9, I have illustrated a modification of the invention in which the rails for guiding the blocks of ice are located under the surface of the water. 29ª are the rails supported on a suitable framework and the rails, in this case, extend a sufficient distance so as to support an incoming block of ice, as well as the two blocks being cut, and, in this instance, the blocks of ice are spaced a given distance apart and a pusher 40, shaped as shown in Fig. 5, engages the block of ice after the longitudinal kerfs have been cut therein and pushes the block of ice, on the return movement of the saw carriage, in position to be cut by the transverse saws. In this instance, the rails support the block of ice so as to prevent any yielding of the block during the cutting operation.

I claim:

1. The combination of a channel to receive blocks of ice to be cut, longitudinal guides, a saw frame mounted on the guides and spanning the channel, a series of circular saws mounted on the frame and arranged to cut kerfs in the block of ice, means for holding the block of ice during the cutting operation, and means connected with the saw frame for engaging a succeeding block of ice and moving it into position to be cut as the saw frame returns to its first position.

2. The combination with mechanism for cutting ice, of a channel, two sawing mechanisms, each consisting of a frame having a series of circular saws thereon, means for driving the saws, longitudinal guides for one frame and transverse guides for the other frame located back of said first mentioned frame, means for traversing the frames on their respective guides, and means on the frame mounted on the longitudinal guides for engaging a block of ice and moving into cutting position under said frame, means for holding the ice in position, the two sawing mechanisms being so located that the block of ice having the longitudinal kerfs cut therein will be moved into position to be cut transversely by the frame as the frame on the longitudinal guides returns to its first position.

3. The combination in mechanism for cutting ice, of a channel; a saw frame spanning the channel; longitudinal rails on which the saw frame is mounted; means for driving the frame so that it will travel on said rails; a series of saws carried by the frame; means for driving the saws; arms on the frame having hooks arranged to engage a block of ice, the hooks being of such a length that they will engage the block of ice succeeding the one being cut after the saws have penetrated said block a given distance so that, on the return movement of the saw frame, the said block of ice will be moved into the cutting position and will be guided by the saws and hooks.

4. The combination in mechanism for cutting ice, of a channel; longitudinal guides and transverse guides; a saw frame mounted on the longitudinal guides and a saw frame mounted on the transverse guides; means for driving each of said saw frames; means for guiding the blocks of ice as they move into position to be cut; and a pivoted brake located under the surface of the water and arranged to engage a block of ice as it moves into position to be cut by the transverse saws.

5. The combination in mechanism for cutting ice into blocks, of means for cutting kerfs in the ice both longitudinally and transversely; guide rails for directing the blocks of ice into the cutting position; a pivoted brake having spikes at each end arranged to engage the block of ice and to hold it while it is being cut by the transverse saws.

HOWELL D. PRATT.

Copies of this patent may be obtained for five cents each, by addressing the "Commissioner of Patents, Washington, D. C."